(12) United States Patent
Glistvain (10) Patent No.: US 8,209,694 B2
(45) Date of Patent: Jun. 26, 2012

(54) SINGLE-STACK REAL-TIME OPERATING SYSTEM FOR EMBEDDED SYSTEMS

(75) Inventor: Roman Glistvain, Plymouth, MN (US)

(73) Assignee: Turck Holding GmbH, Halver (DE)

( * ) Notice: Subject to any disclaimer, the term of this patent is extended or adjusted under 35 U.S.C. 154(b) by 0 days.

(21) Appl. No.: 12/902,596

(22) Filed: Oct. 12, 2010

(65) Prior Publication Data

US 2011/0088037 A1   Apr. 14, 2011

Related U.S. Application Data (60) Provisional application No. 61/251,015, filed on Oct. 13, 2009.

(51) Int. Cl.
*G06F 9/46* (2006.01)
(52) U.S. Cl. ........................................ 718/103
(58) Field of Classification Search .................. None
See application file for complete search history.

(56) References Cited

U.S. PATENT DOCUMENTS

| | | | |
|---|---|---|---|
| 7,383,368 B2 | 6/2008 | Schopp | |
| 2006/0190943 A1* | 8/2006 | Haeri | 718/103 |

FOREIGN PATENT DOCUMENTS

WO  WO 2005/085944 A2   9/2005

OTHER PUBLICATIONS

Romain Glistvain et al: "Romantiki OS—A single stack Multitasking Operating System for Resource Limited Embedded Devices.", Informatics and Systems (INFOS), 2010 the 7th International Conference ON, IEEE, US, Mar. 28, 2010.
Dunkels A et al: "Protothreads: Simplifying Event-Driven Programming of Memory-Constrained Embedded Systems", SENSYS '06: Proceedings of the Fourth Internationl Conference on Embedded Networked Sensor Systems, 2006 Association for Computing Machinery US, 2006.
European Patent Office (acting as ISA), International Search Report and Written Opinion for corresponding application for Single-Stack Real-Time Operating System for Embedded Systems, PCT Application No. PCT/US2010/052282, PCT, Mailed Feb. 18, 2011.
International Preliminary Examining Authority—U.S. (IPEA/US), International Preliminary Report on Patentability, Completed Oct. 11, 2011, Mailed Nov. 1, 2011, IPEA/US, PCT Application PCT/US10/52282, Alexandria, VA.

(Continued)

*Primary Examiner* — Emerson Puente
*Assistant Examiner* — Gregory Kessler
(74) *Attorney, Agent, or Firm* — Moore & Hansen, PLLC (57) ABSTRACT

A real time operating system (RTOS) for embedded controllers having limited memory includes a continuations library, a wide range of macros that hide continuation point management, nested blocking functions, and a communications stack. The RTOS executes at least a first and second task and uses a plurality of task priorities. The tasks share only a single stack. The task scheduler switches control to the highest-priority task. The continuations library provides macros to automatically manage the continuation points. The yield function sets a first continuation point in the first task and yields control to the task scheduler, whereupon the task scheduler switches to the second task and wherein at a later time the task scheduler switches control back to the first task at the first continuation point. The nested blocking function invokes other blocking functions from within its body and yields control to the task scheduler.

22 Claims, 5 Drawing Sheets

OTHER PUBLICATIONS

Rich Goyette, "An Analysis and Description of the Inner Workings of the FreeRTOS Kernel", Apr. 2007, Carlton University, Department of Systems and Computer Engineering.

Adam Dunkels, Björn Grönvall, and Thiemo Voigt, "Contiki—a Lightweight and Flexible Operating System for Tiny Networked Sensors", Proceedings of the First IEEE Workshop on Embedded Networked Sensors (Emnets-1), Tampa, Florida, USA, Nov. 2004.

* cited by examiner

SINGLE-STACK REAL-TIME OPERATING SYSTEM FOR EMBEDDED SYSTEMS

CROSS-REFERENCE TO RELATED APPLICATIONS

This invention claims benefit of U.S. Provisional Patent Application No. 61/251,015 filed Oct. 13, 2009, by Roman Glistvain, titled "Real Time Operating System"; and is incorporated herein by reference in its entirety.

FIELD OF THE INVENTION

The present invention relates to real time operating systems, and more particularly to operating systems for embedded systems.

BACKGROUND OF THE INVENTION

Embedded systems generally are devices whose primary purpose is to perform an independent action such as encoding video, controlling robots, routing Internet traffic, and so on. Such devices run autonomously without user intervention, however, there needs to be a way to configure/monitor/troubleshoot these devices.

"Embedded Systems" is a group of embedded devices which is growing rapidly and expanding into different markets. The common characteristic of devices in this group is "fixed functionality". These devices start with a predefined set of application tasks and this set can not be modified. They do not allow users to upload and run third-party programs. This assumption allows us to reduce software complexity and to create very small, inexpensive and reliable systems.

The current generation of embedded networking devices use standard off-the-shelf components such as operating systems (OS), file systems, Web servers and SNMP agents in order to provide the networking and application tasks. Due to various reasons, these systems typically involve expensive and complex hardware designs and inefficient software designs. Due to such inefficiencies, these systems contain huge amounts of code and require large amounts of RAM and high CPU speeds to support any reasonably robust networking infrastructure. This makes the devices expensive and unsuitable for certain applications. The large amount of code also results in a very slow startup time which blocks the adaptation of networking into certain devices such as TV sets, DVD players and other kinds of devices which need to be turned off and on quite often and require boot-up times on the order of one second.

Several operating systems have been developed due to the strong demand for operating systems that are capable of operating in a real time environment and on embedded systems having limited resources although each have limitations and trade-offs due to the limited resources of the embedded systems in which they are designed to operate.

Contiki OS is one such operating system that has a small footprint (e.g., small ROM and RAM requirements) and can therefore be run on an embedded system having limited resources, however Contiki OS does not allow assigning per-task priority (i.e., all tasks have the same priority) and therefore it is hard to provide real-time response in some situations. Contiki OS also uses "protothreads" to provide multitasking abstractions that use the same stack (i.e., local memory) for all tasks. Protothreads is a programming model invented by Adam Dunkels that combines the advantages of event-driven programming and threaded programming and which also provides support for "blocking nested functions". The following reference provides additional information on Contiki OS (A. Dunkels, B. Grnvall, and T. Voigt "Contiki O/S. Contiki—a Lightweight and Flexible Operating System for Tiny Networked Sensors", IEEE International Conference on Local Computer Networks pp 455-462 2004) and is incorporated herein by reference in its entirety. The following reference provides additional information on Contiki OS (Adam Dunkels, Oliver Schmidt, Thiemo Voigt, and Muneeb Ali. "Protothreads: Simplifying Event-Driven Programming of Memory-Constrained Embedded Systems", Proceedings of the Fourth ACM Conference on Embedded Networked Sensor Systems 2006) and is incorporated herein by reference in its entirety.

FreeRTOS is another such RTOS that has been developed to run on resource-limited embedded systems and has the advantages that it is easier to write the code and provides more precise real-time deadline handling when used in preemptive multitasking mode. The disadvantages of FreeRTOS is that it requires the stack size to be hand tuned for each task, which is hard to implement in complex applications and FreeRTOS potentially requires a larger RAM due to using multiple stacks for preemptive scheduling. Additional information about FreeRTOS can be located at www.freertos.org. An additional operating mode of FreeRTOS, named FreeRTOS CoRoutine mode, provides a potentially smaller footprint than standard FreeRTOS due to using cooperative scheduling (as opposed to preemptive scheduling) and single stack for all tasks as well as prioritized tasks. The main disadvantage of FreeRTOS CoRoutine mode is that it is hard for developers to write software using it due to the lack of "blocking nested functions". Additional information about using FreeRTOS in CoRoutine mode can be located at www.freertos.org/croutine.html.

SalvoRTOS is yet another such RTOS that has been developed to run on resource-limited embedded systems and is very similar to FreeRTOS in CoRoutine mode in that SalvoRTOS also has the advantage of a small footprint and provides cooperative scheduling with prioritized tasks. SalvoRTOS also shares the disadvantage of being without "blocking nested functions". Additional information regarding SalvoRTOS is located at www.pumpkininc.com/content/doc/press/salvoflyer.pdf.

One reason behind the complex software and expensive hardware required to provide networking functionality is the requirement to run traditional networking operating systems. Even though commercially available microcontroller products (from NXP, Atmel, and others) feature Ethernet connectivity and cost <$10 with integrated flash/ram memory, most integrators typically use the combination of separate CPU, RAM, and flash memory which costs far more. The primary reason is that such small microcontrollers with built-in Ethernet typically feature very limited amount of RAM and flash (in particular RAM), which contradicts the basic scenario of designs using the classic operating system approach. Developers also are used to adapting off the shelf open source components into new projects which are written in a generic way and are not optimized specifically for the small microcontroller application. This means that those components contain substantial amounts of extra code which is not used in the embedded system, and the footprint of the component is not suitable for a small microcontroller.

BRIEF SUMMARY OF THE INVENTION

In some embodiments, the present invention provides a computerized method of real time operating system (RTOS) operation of a computer processor. This method includes performing, in the computer processor, a first plurality of tasks including a first task and a second task, wherein not all of the first plurality of tasks run at the same priority, wherein the first plurality of tasks share and use only a single stack; providing a single stack; using and sharing the single stack by all of the first plurality of tasks; automatically managing a plurality of continuation points, wherein the plurality of continuation points includes a first continuation point and a second continuation point; creating the first continuation point in the first task and yielding control to a task scheduler; selectively switching control to a highest-priority one of the first plurality of tasks using the task scheduler, wherein the second task is the highest-priority one of the first plurality of tasks; switching control back to the first task at the first continuation point at a later time; and executing a first blocking function within the first task such that the task scheduler switches to the second task and executing a second blocking function in the second task before continuing the first task after the first blocking function has executed.

In some embodiments, the present invention provides a computer-readable medium having instructions embedded thereon, wherein the instructions, when performed on a computer processor, execute a method of real time operating system (RTOS) operation, the method including: performing, in the computer processor, a first plurality of tasks including a first task and a second task, wherein not all of the first plurality of tasks run at the same priority, wherein the first plurality of tasks share and use only a single stack; providing a single stack; using and sharing the single stack by all of the first plurality of tasks; automatically managing a plurality of continuation points, wherein the plurality of continuation points includes a first continuation point and a second continuation point; creating the first continuation point in the first task and yielding control to a task scheduler; selectively switching control to a highest-priority one of the first plurality of tasks using the task scheduler, wherein the second task is the highest-priority one of the first plurality of tasks; switching control back to the first task at the first continuation point at a later time; and executing a first blocking function within the first task such that the task scheduler switches to the second task and executing a second blocking function in the second task before continuing the first task after the first blocking function has executed.

In some embodiments, the present invention provides a real time operating system (RTOS) for a computer processor performing a plurality of tasks including at least one application task, wherein not all of the plurality of tasks run at the same priority. This RTOS includes a kernel that serves each of the plurality of tasks, the kernel including: a core having a task scheduler that reads from a task descriptor data structure to which each application task writes, a timer subsystem, in which a timer task reads from and writes to a timer-wait queue written by each of the plurality of application tasks, and the timer task also writes to the task-descriptor data structure, and a mutex subsystem that uses services provided by an event subsystem and the timer subsystem, wherein the event subsystem also serves the timer subsystem; and a continuations library that serves the kernel and each application task by using macros to automatically manage continuation points such that handling of the continuation points are hidden from a user.

The accompanying figures are schematic only and pertain to a particular embodiment as an example. Thus, they are not intended to limit the scope of this disclosure or any claims which may rely on it.

DETAILED DESCRIPTION OF THE INVENTION

Although the following detailed description contains many specifics for the purpose of illustration, a person of ordinary skill in the art will appreciate that many variations and alterations to the following details are within the scope of the invention. Accordingly, the following preferred embodiments of the invention are set forth without any loss of generality to, and without imposing limitations upon, the claimed invention. Further, in the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention.

The leading digit(s) of reference numbers appearing in the Figures generally corresponds to the Figure number in which that component is first introduced, such that the same reference number is used throughout to refer to an identical component which appears in multiple Figures. Signals and connections may be referred to by the same reference number or label, and the actual meaning will be clear from its use in the context of the description.

This specification also incorporates the entire contents, as if fully set forth herein, any document which is cited by any of the documents referenced in this specification.

The following published references are each incorporated herein by reference in their entirety:

"Bringing TCP/IP networking to resource limited embedded systems," by Roman Glistvain, et al. and published in Mechatronics and Embedded Systems and Applications (MESA), 2010 IEEE/ASME International Conference on, vol., no., pp. 239-244, doi: 10.1109/MESA.2010.5552061; and "Romantiki OS—A single stack multitasking operating system for resource limited embedded devices," by Roman Glistvain, et al. in Informatics and Systems (INFOS), 2010 The 7th International Conference Proceedings on pp. 1-8; and Master's of Science thesis titled "Romantiki O/S—networking operating system for limited memory embedded devices" by Roman Glistvain, M. Sc., YORK UNIVERSITY, 2010, 157 pages; MR62237.

The following description necessarily relies on a particular preferred embodiment as an example. Accordingly, specific reference to structures for performing a function should also be understood as being intended to disclose performance of the function per se by the same or equivalent structures.

It should be understood that descriptions of computer code per se or the functions performed by such code could alternatively be expressed as: (1) sequences of steps performed by a machine, such as a computer programmed to execute such code; or (2) a computer-readable medium storing such code.

Table 1 below provides a listing and definition of acronyms that are used in the present specification.

TABLE 1

A listing of acronyms and their definitions as used in the present specification.

| Acronym | Definition |
| --- | --- |
| API | Application Programming Interface |
| ACK | Acknowledgement |
| ARP | Address Resolution Protocol |
| BOOTP | Bootstrap Protocol |
| BSD | Berkeley Software Distribution |
| C | "C" Computer language |
| CLZ | Count Leading Zeros |
| CPU | Central Processing Unit |
| DHCP | Dynamic Host Configuration Protocol |
| DUT | Device Under Test |
| ECB | Event Control Block |
| FIFO | First In First Out |
| Flash | Flash Memory |
| GPS | Global Positioning System |
| GUI | Graphical User Interface |
| HMI | Human Machine Interface |
| HTTP | Hyper Text Transfer Protocol |
| ICMP | Internet Control Message Protocol |
| ID | Identifier |
| IGMP | Internet Group Management Protocol |
| I/O | Input/Output |
| IP | Internet Protocol |
| IPC | Inter Process Communication |
| IPv4 | Internet protocol Version 4 |
| IPv6 | Internet protocol Version 6 |
| kb, KB | kilobytes |
| LAN | Local Area Network |
| MAC | Medium Access Control |
| MB | Megabytes |
| MCU | Microcontroller |
| MMU | Memory Management Unit |
| MPEG-TS | Moving Picture Experts Group-Transport Stream |
| MPU | Microprocessor |
| MUTEX | Mutual Exclusion |
| O/S | Operating System |
| PDA | Personal Digital Assistant |
| PLC | Programmable Logic Controller |
| RAM | Random Access Memory |
| ROM | Read Only Memory |
| RTOS | Real Time Operating System |
| RX | Receive |
| SD | Secure Digital |
| SOC | System on Chip |
| SNMP | Simple Network Management Protocol |
| TCB | Task Control Block |
| TCP | Transmission Control Protocol |
| TCP/IP | Transmission Control Protocol, Internet Protocol |
| TI | Texas Instruments |
| TX | Transmit |
| UDP | User Datagram Protocol |

In some embodiments, the present invention provides an operating system (hereinafter referred to as the ROMANTIKI™ Operating System, or "ROMANTIKI™ OS" or "Romantiki™") that is configured to operate in real time and finds particular benefit when implemented in an embedded system have limited resources.

In some embodiments, the ROMANTIKI™ Operating System includes the following characteristics:
1. A small footprint;
2. A fast boot-up time (in some embodiments, the boot-up time is nearly instantaneous due to the small footprint);
3. The ability to perform networking tasks on resource-limited microcontrollers;
4. A real-time operating system (RTOS) configured for cooperative-multitasking;
5. The use of context switching based-on "protothreads";
6. "blocking nested functions";
7. A bitmap scheduler to provide a fast and deterministic method of task scheduling; and
8. An API that removes the need for developers to handle continuation-point management, thereby improving software development and maintenance.

In some embodiments, ROMANTIKI™ OS includes a single rewinding stack for all tasks, resulting in a significantly lower stack size requirement compared to traditional operating systems, a multitasking coding style such that a common operating system abstraction layer can be created that allows sharing application code between projects running on complex operating systems and projects developed for resource limited systems running Romantiki™, and priority-based scheduling to achieve a "cooperative real-time" functionality that handles real-time events at the task level.

In some embodiments of ROMANTIKI™ OS (i.e., the RTOS described in this application) is written in the C language using Microsoft Visual C++, which allowed the code to be tested before being moved to each of an LM3S9682 emulation board and an Atmel AT91SAM7X512 general purpose microcontroller unit (MCU) having only 512K bytes of embedded high-speed flash memory and 128K bytes of SRAM. In some other embodiments, ROMANTIKI™ OS is written in a programming language that is useful for writing operating system code, or the like.

In some embodiments, ROMANTIKI™ OS is based on a classical multitasking model and includes a kernel that provides various services and a task scheduler. The application project consists of multiple tasks each of which uses services provided by the kernel.

Figure 1:
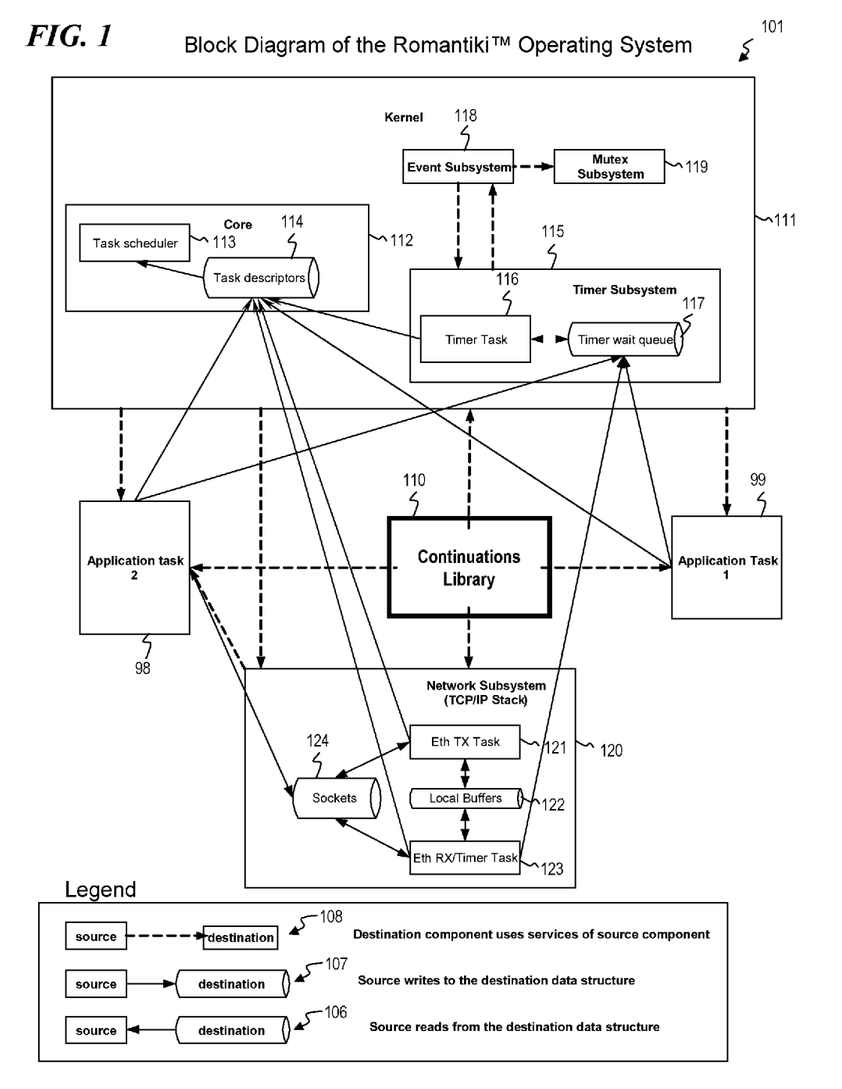
FIG. 1 is a schematic block diagram of the ROMANTIKI™ Operating System (OS) 101, according to some embodiments of the present invention.

FIG. 1 shows a block diagram of ROMANTIKI™ Operating System 101, according to some embodiments of the present invention. In some embodiments, ROMANTIKI™ OS 101 includes continuations library 110, kernel 111, and network subsystem 120. In some embodiments, kernel 111 includes core 112 having a task scheduler 113 and task descriptors storage 114, timer subsystem 115 having time task 116 and timer wait queue storage 117, event subsystem 118, and MUTEX subsystem 119. In some embodiments, network subsystem 120 includes Ethernet TX task 121, Ethernet receive and time task 123, local buffers 122 and sockets 124.

In FIG. 1, legend 109 is included to provide additional guidance as to the functionality provided by ROMANTIKI™ OS 101. Symbol 108 in legend 109 (represented by a "source" labeled box (i.e., the source component) connected to a "destination" labeled box (i.e., the destination component) by a dashed-line arrow having the arrow pointing from the "source" box to the "destination" box) represents the destination component uses services provided by the source component. Symbol 107 in legend 109 (represented by a "source" labeled box (i.e., the source component) connected to a "destination" labeled cylinder (i.e., the destination data structure) by a solid-line arrow having the arrow pointing from the "source" box to the "destination" cylinder) represents the source writes to the destination data structure. Symbol 106 in legend 109 (represented by a "source" labeled box (i.e., the source component) connected to a "destination" labeled cylinder (i.e., the destination data structure) by a solid-line arrow having the arrow pointing from the "destination" cylinder to the "source" box) represents the source reads from the destination data structure.

In some embodiments, task scheduling in ROMANTIKI™ OS is cooperative, meaning the task scheduler (hereinafter "task scheduler" is also referred to as just "scheduler") will allow a high-priority process to run only when the current task yields the control to the scheduler. In some embodiments, the scheduler of ROMANTIKI™ OS is based on a bitmap scheduler and uses a 32-bit number with thirty-one (31) tasks allowed in the system, wherein each task has a unique single-bit-position priority number (bit 31 to bit 1, wherein bit 0 is reserved). In some other embodiments that reserve bit 0, the ROMANTIKI™ OS scheduler is based on a bitmap scheduler and uses an 8-bit number with up to 7 tasks allowed in the system and up to 7 unique levels of task priority, or a 16-bit number with up to 15 tasks allowed in the system and up to 15 unique levels of task priority, or a 64-bit number with up to 63 tasks allowed in the system and up to 63 unique levels of task priority, or a 128-bit number with up to 127 tasks allowed in the system and up to 127 unique levels of task priority, or a 256-bit number with up to 255 tasks allowed in the system and up to 255 unique levels of task priority. In some embodiments, the number of unique task levels included in the ROMANTIKI™ OS scheduler is any natural number (i.e., positive integer).

In some embodiments, ROMANTIKI™ OS is configured to use local continuations to perform context switching by using a local-continuations library. In some embodiments, ROMANTIKI™ OS uses local continuations to provide the functionality of blocking system calls. In some embodiments, the ROMANTIKI™ OS local-continuations library provides additional features not present in other conventional local-continuation libraries. In some embodiments, ROMANTIKI™ OS local-continuations library includes:

1) An abstraction layer that hides the definition and management of continuation points away from the developer, thereby making the code easier to write and maintain;
2) Support for re-entrant and non-reentrant blocking functions having different sets of macros;
3) Reduced functionality of the local continuation library, such that:
   a. Event handling is part of the inter-task communication API and it is integrated into the operating system kernel, and
   b. Reduced number of API calls makes the API easier for developers to memorize; and
4) An OS local-continuation library that allows making blocking calls within nested functions. In some embodiments, the ability to make blocking calls within nested functions makes it possible to adapt existing code into the ROMANTIKI™ OS and maintain the same code-base between different operating systems.

In some embodiments, the local-continuations library includes the following features for handling reentrant blocking functions:

1. Compile time allocation of resources are required for reentrant blocking functions;
2. Built-in constructs for declaring local variables of reentrant blocking functions in structures;
3. Inheritance tree of structures to create hierarchical storage of local and global variables used in context of reentrant blocking functions;
4. Binding of structures used for reentrant blocking functions to tasks and storing them in task control block;
5. Management of hierarchical tasks. This provides functionality of hierarchical scheduling; and
6. Access variables using macros.

This method of creating reentrant blocking functions results in a longer development cycle as multiple steps are required to be done by the developer in order to create reentrant blocking code. However, this approach provides determinism in memory allocation for variables in reentrant blocking functions as well as low CPU overhead.

In some embodiments, ROMANTIKI™ OS is configured to include system calls, including the following kernel services:

1. Task manipulations include:
   Task Creation
   Task Startup
   Conditional Yielding
2. Events
   Event creation
   Event triggering—Can be executed at a task level or at the interrupt level
   WaitSingleEvent—blocks the task until an event arrives
   WaitMultipleEvents—Allows implementing "select" functionality and blocks the task until one or more of the required events arrive or a timeout occurs
   ClearEvent
3. Timer API
   OS_Sleep—Blocks the running task for the given number of milliseconds.
   getOsTick—Get the snapshot of the operating system tick counter.
4. Semaphores
   semTake
   semGive
5. TCP/IP Socket API—Provides TCP and UDP capabilities In some embodiments, the ROMANTIKI™ OS system-call API is small compared to the traditional operating systems. In some embodiments, the typical functionality included in traditional operating systems of task deletion, suspension, dynamic memory management and message queues is not part of the ROMANTIKI™ OS kernel. In some other embodiments, some or even all of the above system-call functionality is implemented using ROMANTIKI™ OS in the application level and is based on the requirements of each individual project, however, many embedded systems using ROMANTIKI™ OS can be implemented without the above system-call functionality. In some embodiments, implementing the above system-call functionality outside the scope of the ROMANTIKI™ OS kernel is advantageous because it makes ROMANTIKI™ OS a simpler operating system that is relatively easy for developers to learn and use in many embedded applications.

In some embodiments, the ROMANTIKI™ OS uses events as a main mechanism for inter-task communication and ROMANTIKI™ OS builds more advanced objects, (e.g., in some embodiments, the advanced objects include timers, sockets, and mutexes), using events. In some embodiments of ROMANTIKI™ OS, a task can wait for one or more events while other tasks or interrupts trigger events. In some embodiments, the functionality of the event subsystem in ROMANTIKI™ OS is similar to Event API in the Windows operating system.

In some embodiments, the event API consists of two function groups:

1. Trigger Event—A non-blocking function which can be called from tasks and interrupts.
2. Wait For Event(s)—The calling task is suspended until one or more events that it is waiting for have been triggered.

In some embodiments, each event in ROMANTIKI™ OS has an event control block (ECB) associated with it and because tasks in ROMANTIKI™ OS can be blocked as they are waiting for events, unrelated events do not unblock the waiting task. Therefore, in some embodiments, each ECB contains a pointer to the Task Control Block (TCB) of the task which is currently blocked on the event. In some embodiments, other fields in the ECB contain event status and configuration information.

In some embodiments, the event triggering function is part of the kernel and it therefore sets the task pending as soon as the event is triggered. In some embodiments, the "event triggering" function will automatically set the "pending" state of the task and also sets up "preemption_request" variable if the priority of the task which is currently set to pending state is higher than the priority of the task which is currently running.

Figure 2:
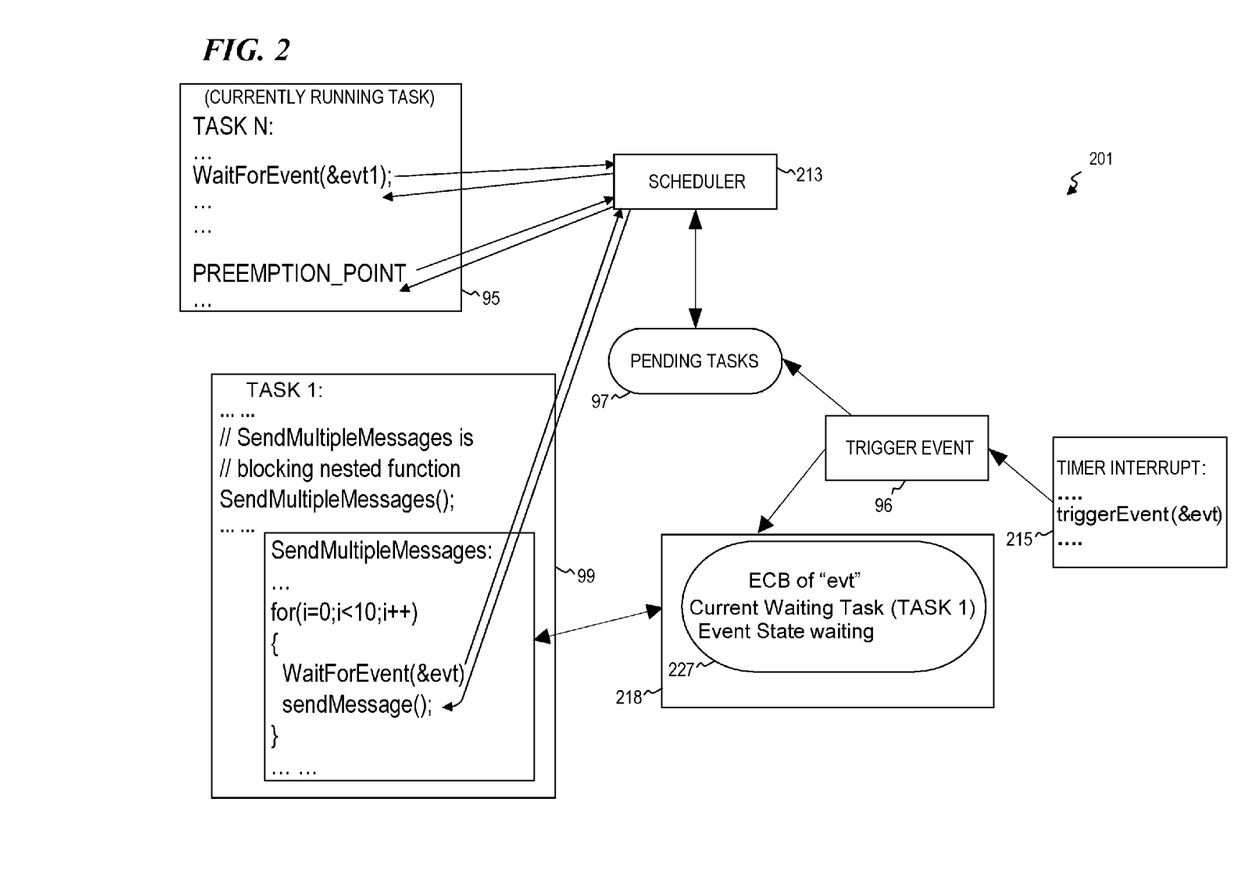
FIG. 2 is a schematic block diagram 201 of the interaction between events and the event control block (ECB) 227, according to some embodiments of the present invention.

FIG. 2 is a schematic block diagram of the usage of the event control block (ECB) 227, according to some embodiments of the present invention and demonstrates the process of event handling and an interaction between an interrupt (e.g., in this case a timer interrupt 215), the task scheduler 213 and a task 99. In some embodiments, task scheduler 213 includes a data structure (e.g., in some embodiments, a queue, array, linked list, or the like) of pending tasks 97, and when the timer interrupt 215 triggers an event 218, the event triggering function 96 updates the queue of pending tasks 97 if event control block 227 indicates that there is a task waiting for the event 99. A currently running task 95 at some point yields (via a blocking function (e.g., WaitForEvent(&evt1)) or a conditional yield function (e.g., PREEMPTION_POINT), which gives control to the scheduler 213. The scheduler switches in the currently waiting task (Task-1 99). In some embodiments, the event 218 (which points to its ECB 227) is invoked by the trigger event function 96 called from the currently running task instead of an interrupt.

At an earlier time, Task-1 99 was executing in the FOR loop shown in FIG. 2, and came to the WaitForEvent(&evt) instruction, which caused Task-1 to be blocked, waiting for an event and the Event control block 227 to be updated with the pointer to the task 99 waiting for this event and some other task was started. At a later point in time, the timer interrupt 215 triggered an event 218 by executing an event triggering function 96. Event triggering function 96 uses the event control block 227 to determine that Task-1 99 was waiting for event 218 that causes an update to "pending tasks queue" 97. At some time, the currently running task 95 blocks or yields, and that forces execution of scheduler 213. The scheduler decides to switch in Task-1 99, which then starts at its continuation point (in this case, the sendMessage operation is executed).

In some embodiments, the WaitForEvent is a blocking function that yields control to the task scheduler in order to wait for a particular event (e.g., timer interrupt 215); the task scheduler 213 will then switch control to another pending task on the queue of pending tasks 97. In contrast, a yield function is one that yields control to the task scheduler 213 in without any conditions on any particular event; the task scheduler 213 will then switch control to the highest-priority pending task. The pending tasks of the task scheduler 213 are indicated on a queue of pending tasks 97 associated with the task scheduler.

In some embodiments of ROMANTIKI™ OS, only one task can be blocked on a certain event at a certain instance of time.

Figure 3:
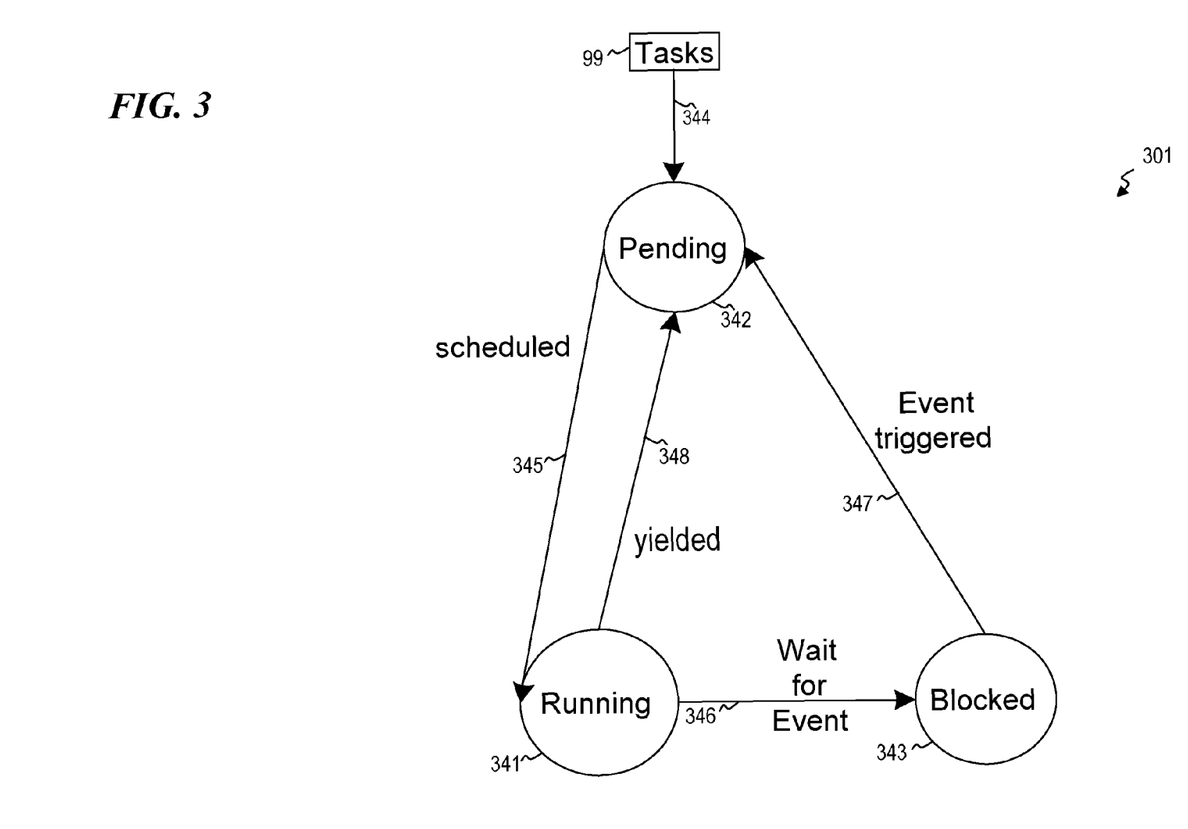
FIG. 3 is a schematic block diagram of the state diagram representing the task state 301, according to some embodiments of the present invention.

In some embodiments of ROMANTIKI™ OS, a task can be in one of the three (3) states: blocked 343, pending 342, or running 341. FIG. 3 is a schematic block diagram of the state diagram representing the task state, according to some embodiments of the present invention. In some embodiments, tasks 99 are placed 344 into the pending state 342. In some embodiments, a task that is in pending state 342 moves from pending state 342 to running state 341 when the task is scheduled 345. In some embodiments, a task that is in running state 341 can yield 348 from running state 341 back to pending state 342 or a task that is in running state 341 can be blocked to wait for an event 346 and move from running state 341 to blocked state 343. In some embodiments, a task that is in blocked state 343 will move back to pending state 342 after the event is triggered 347. In some embodiments, the scheduler maintains a list of pending tasks, the pending list is updated during event triggering or conditional yielding, and when the currently running process yields, the scheduler gets a chance to run and the scheduler selects the highest priority task from the pending list and invokes its processing function.

In some embodiments, ROMANTIKI™ OS is configured to include conditional yielding to improve operating performance. Unconditional yielding is a common mechanism used in traditional cooperative operating systems to allow other tasks to run while one task executes long-running operations such as complex mathematics. During the process of yielding, the scheduler gets control and selects the next task from the pending list. If there are no other tasks present in the pending list, the current task is re-invoked and continues executing. Therefore, the use of an unconditional yield statement results in a wasted invocation of the scheduler and frequent rescheduling of the currently running task even when there are no higher-priority tasks pending.

Because each task in ROMANTIKI™ OS has a unique priority, in some embodiments, a task will yield only if there is a higher-priority pending task. In some embodiments, ROMANTIKI™ OS avoids the inefficiency of unconditional yielding by providing a construct that forces the task to yield only when a higher priority task is pending. In some embodiments, it is possible to provide this conditional-yielding functionality in ROMANTIKI™ OS because the inter-task communication mechanisms are implemented using events and each task has a unique priority in the system.

In some embodiments, the conditional-yielding functionality is implemented by allowing the developer to insert special command (e.g., in some embodiments, "PREEMPTION_ POINT") into the developer's code. In some embodiments, the "PREEMPTION_POINT" command is a macro which contains the following functionality:
1. Check the global variable "preemption_request";
2. If "preemption_request==TRUE" then YIELD; and
3. Otherwise continue execution of the current task.

In some embodiments, the "preemption_request" variable is updated inside the event triggering function "asyncTriggerEvent" which checks whether or not the task waiting on the event has a higher priority than the currently running task. (This is the main algorithm of conditional yielding. The interrupt or currently running task will execute an "eventTrigger" function. This function will update "pending" tasks queue as well as check if the newly invoked task has a higher priority than the currently running task. If so, it will set the global flag "preemption_request" to "TRUE". Then, the currently running task continues execution and runs at some point into "PREEMPTION_POINT" macro inserted by the developer throughout the code of each task. This macro will perform the algorithm described in the previous two paragraphs above and potentially will yield giving control to the scheduler if the higher priority task is pending.)

The following code illustrates one example of the use of Conditional Yielding according to some embodiments of the present invention:

```
for (i=0; i < sizeof(pData); i++)
{
    val=(val<<8)^table[(val>>8)^pData[i]];
    PREEMPTION_POINT( ); // Conditionally Yield
}
```

Figure 4:
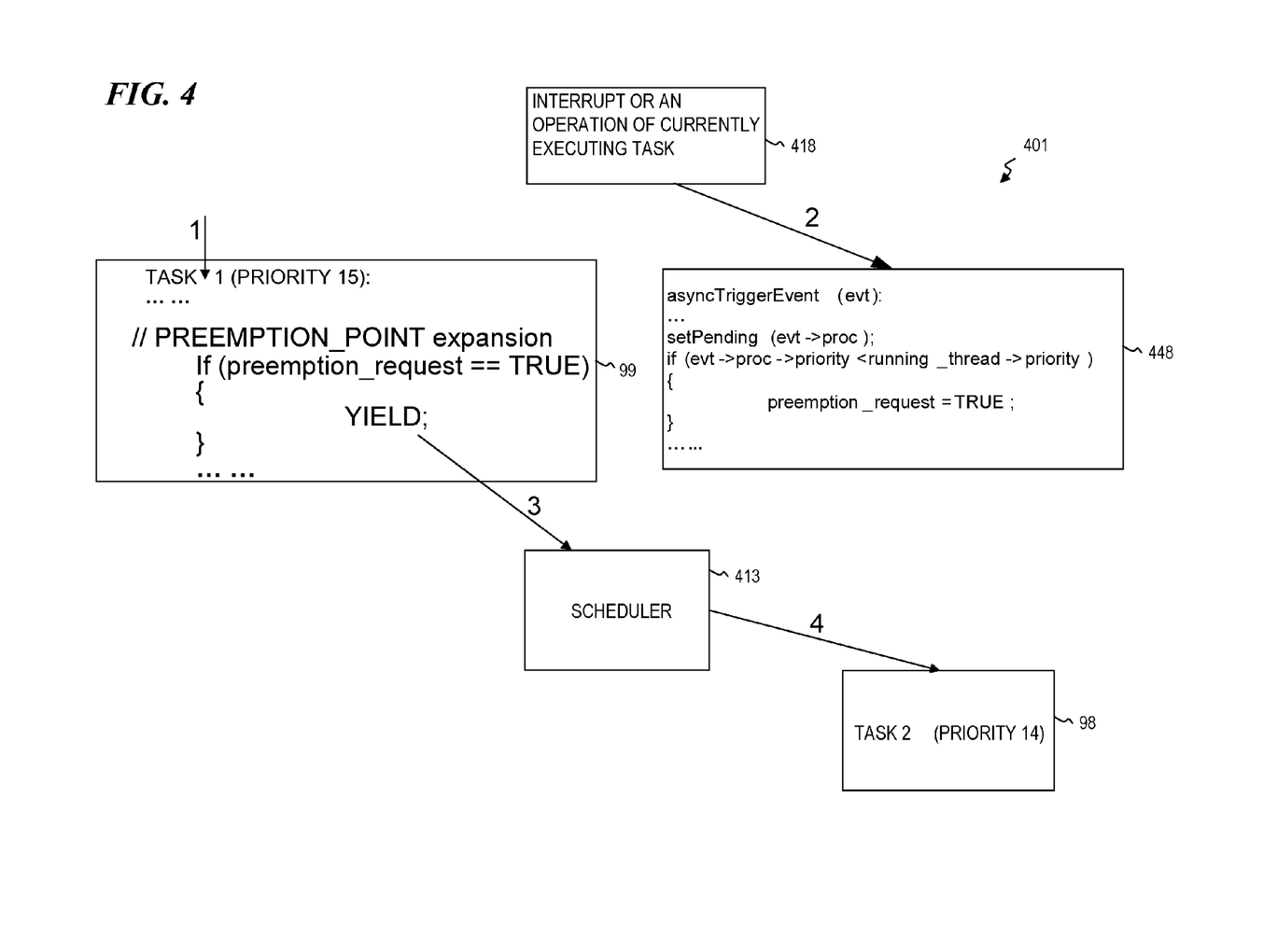
FIG. 4 is a schematic diagram of the conditional yielding operation 401, according to some embodiments of the present invention.

FIG. 4 is a schematic diagram of the conditional yielding operation 401, according to some embodiments of the present invention. FIG. 4 provides an illustration of the conditional yielding operation and each state transition is marked with a number which indicates the sequence of that specific event. In some embodiments, a first task 99 having a priority of "15" is being executed and first task 99 includes the PREEMPTION_POINT code discussed earlier to pause the first task 99 and check to see if there is a task with a higher priority (i.e., in this example, a task with a higher priority than "15"). In some embodiments, when first task 99 executes the PREEMPTION_POINT code, first task 99 pauses to determine if the variable "preemption_request" is TRUE or FALSE. As discussed above, the "preemption_request" variable is updated inside the event triggering function "asyncTriggerEvent" 448 which is executed from an interrupt or currently running task 418. In the present example, "preemption_request"=TRUE because a second task 98 with a priority of "14" is waiting to execute and second task 98 has a higher priority than first task 99, and so, first task 99 yields control to scheduler 413, and scheduler 413 tells second task 98 to begin executing.

In some embodiments, if a higher priority task was not waiting, (i.e., because "preemption_request"=FALSE), then first task 99 would not have yielded control to the scheduler 413, and first task 99 would have continued to execute from where it had paused.

In some embodiments, ROMANTIKI™ OS is configured to include an energy-saving mode. In some embodiments, the scheduler in ROMANTIKI™ OS has a special power-saving mode that forces the CPU into a low-power state when all tasks are blocked and the CPU is unblocked whenever an interrupt occurs. In some embodiments, this energy-saving mode provides a significant energy savings and allows ROMANTIKI™ OS to be implemented in battery-powered devices and other devices requiring energy savings.

In some embodiments, ROMANTIKI™ OS is configured to include real-time application support. In some embodiments of ROMANTIKI™ OS, the real-time response is implemented on a cooperative basis, if all the tasks do not run for a long time without yielding, by placing "PREEMPTION_ POINT" commands (e.g., in some embodiments, these are implemented as macros) across long running operations and at various points in the tasks.

In some embodiments, ROMANTIKI™ OS is configured to have a very small footprint. In some embodiments, for example, the core code of ROMANTIKI™ OS requires only about 2.2 Kbytes of Flash and about 316 bytes of RAM when ROMANTIKI™ OS was compiled for and AT91SAM7X256ARM microcontroller (available from ATMEL Corporation, 2325 Orchard Parkway, San Jose, Calif. 95131) using GCC compiler 4.3.2 (available on the internet from gcc.gnu.org/gcc-4.3/) with optimization level—O2. In some embodiments, the core of the ROMANTIKI™ OS includes the task handling API, scheduler, timer subsystem, and the event subsystem.

In some embodiments, ROMANTIKI™ OS is configured to include multitasking while using a single-rewinding stack for the tasks, which allows the creation of projects having the footprint of super-loop programs while at the same time, allowing the application code to be easily maintainable, extendable, and to be shared with projects running on preemptive operating systems.

In some embodiments, the ROMANTIKI™ OS uses a concept similar to Y-Threads where the developer needs to identify sections of the code which perform blocking calls and other sections which run-to-completion. Therefore, in some embodiments, the developer coding for ROMANTIKI™ OS needs to follow certain rules when defining blocking functions, while the non-blocking functions can use the unrestricted C language as they run to completion.

In some embodiments, a common API can be created which is used by applications running on both ROMANTIKI™ OS and traditional operating systems with the goal of this API being to create a transparent operating system abstraction layer that would allow the following common operations:
1. Task definition and creation;
2. Event API; and
3. Timer API In some embodiments, these API calls can be implemented in traditional operating systems such that the API calls match the syntax of corresponding system calls in ROMANTIKI™ OS.

In some embodiments, ROMANTIKI™ OS is configured to include a TCP/IP stack having a "server-only" TCP/IP stack functionality as described in "Bringing TCP/IP networking to resource limited embedded systems," by Roman Glistvain, et al. and published in Mechatronics and Embedded Systems and Applications (MESA), 2010 IEEE/ASME International Conference on, vol., no., pp. 239-244, doi: 10.1109/MESA.2010.5552061. In some other embodiments, a subset of the traditional TCP/IP stack is included by merging some layers of the traditional TCP/IP stacks and making an assumption that the device will generally be operated in local area Ethernet networks. In some embodiments, this allows ROMANTIKI™ OS to go without some certain TCP/IP parameters such as "Netmask" and "Default router" and thus user configuration parameters related to TCP/IP are significantly reduced (e.g., in some embodiments, the user must only configure the IP address). In other embodiments, ROMANTIKI™ OS is configured to include the full implementation of the TCP/IP stack.

Figure 5:
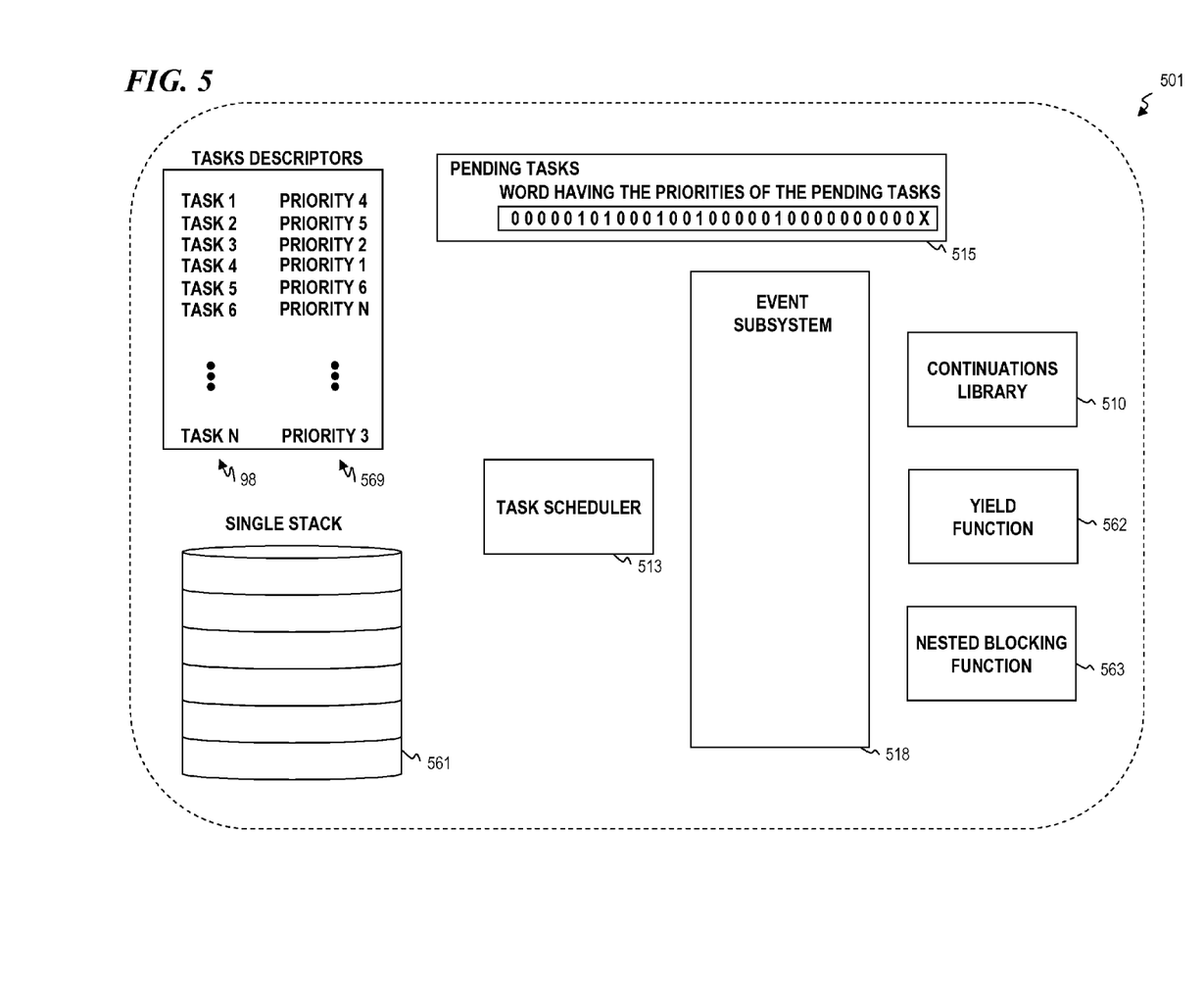
FIG. 5 is a schematic block diagram of the ROMANTIKI™ OS 501, according to some embodiments of the present invention.

FIG. 5 is a schematic block diagram of the Romantiki™ Operating System 501, according to some embodiments of the present invention. In some embodiments, ROMANTIKI™ OS 501 includes stack 561, wherein stack 561 is shared between a plurality of tasks 98 on a time-division basis and wherein each of the plurality of tasks 98 has a priority 569 that determines how the plurality of tasks 561 are hierarchically related. In some such embodiments, each of the plurality of tasks 98 has a unique priority 569. In some other such embodiments, one or more of the plurality of tasks 98 have the same priority 569. In some embodiments, ROMANTIKI™ OS 501 further includes event subsystem 518, pending tasks 515, and task scheduler 513. In some embodiments, ROMANTIKI™ OS 501 further includes continuations library 510, yield function 562, and nested blocking functions 563. In some embodiments, yield function 562 is a conditional yield function.

In some embodiments, ROMANTIKI™ OS is particularly well suited for "Fixed Function Devices" (i.e., devices without the ability to upload user programs) and moreover, devices which do not require very short or critical real-time deadlines. In other embodiments, ROMANTIKI™ OS finds particular application in embedded systems that require one or more of the following features, including a small operating system footprint, fast operation, fast startup, real-time response to some events, Ethernet/IP protocol support, parameterizable Input/Output functionality, and low cost. In some embodiments, a device running ROMANTIKI™ OS has a startup time of 300 milliseconds (ms) or less after the power is supplied to the device.

In some embodiments, ROMANTIKI™ OS has particular application to devices that have small amounts of internal memory and require an extensive set of functionality (e.g., networking functionality of any kind). In some embodiments, ROMANTIKI™ OS allows devices to be built more cheaply and energy efficiently than using complex microcontrollers with external memory (e.g., by using 32-bit microcontrollers with small amounts of integrated RAM and Flash) and have faster time to market than using "superloop" programming style which is traditionally used in 8-bit microcontrollers with small amounts of memory.

In some embodiments, ROMANTIKI™ OS has application in medium sized microcontrollers with internal memory sizes where traditional operating systems (e.g., VxWorks and Linux) don't fit well and that do not require a preemptive mode of operation because, in some embodiments, ROMANTIKI™ OS uses cooperative multitasking.

In some embodiments, ROMANTIKI™ OS is implemented in a 32-bit controller and is configured to 32-bit arithmetic. In other embodiments, ROMANTIKI™ OS is implemented in a 16-bit controller, or an 8-bit controller, or a 64-bit controller, or the like.

In some embodiments, ROMANTIKI™ OS has particular application in embedded web servers, industrial automation modular I/O devices and block I/O devices, communication devices such as switches (i.e., devices where the primary purpose of software is management and not handling high flow of packets on multiple ports), and a variety of fixed function devices (i.e., devices without an ability to extend functionality by uploading 3rd party software into the device).

In some embodiments, ROMANTIKI™ OS has particular application in telecommunication equipment, including managed Ethernet switches, wherein the primary device function is implemented by specialized application specific integrated circuits (ASICs) and the main functionality of the software in the microcontroller is to provide management functionality that has minimal memory requirements and has limited real-time requirements, or management functionality in other telecommunication equipment such as fiber optic equipment, wired/wireless telecommunication equipment used in cellular telephony.

In some embodiments, ROMANTIKI™ OS has particular application in consumer electronics devices, such as simple fixed-function MP3 players.

In some embodiments, ROMANTIKI™ OS has particular application in medical devices.

In some embodiments, ROMANTIKI™ OS has particular application in military devices, such as specialized GPS devices, peer-to-peer communication devices in the battlefield. One such example is a watch that a soldier wears and the watch provides a map of the location where he is currently located and the locations of other soldiers around him and/or also serves as a cell phone that redirects a conversation in a peer-to-peer manner.

In some embodiments, ROMANTIKI™ OS finds particular application in devices where the primary responsibility of the CPU is handling management interfaces of fixed function devices.

In some embodiments, the present invention provides a real time operating system (RTOS) for a computer processor performing a first plurality of tasks including a first task and a second task. This RTOS includes a subsystem providing a plurality of task priorities such that not all of the first plurality of tasks run at the same priority, wherein the first plurality of tasks share and use only a single stack; a task scheduler that, when invoked, switches control to a highest-priority one of the first plurality of tasks; a continuations library subsystem that automatically manages a plurality of continuation points including a first continuation point; a yield function that sets (the yield function does not create continuation point, all continuation points are created at compile time and they are managed by the "yield" function) the first continuation point in the first task and yields control to the task scheduler, whereupon the task scheduler switches control to the second task and wherein at a later time the task scheduler switches control back to the first task at the first continuation point; and a nested blocking function call subsystem, that invokes a second blocking function in the second task from within a first blocking function in the second task (since the nested blocking is bound to the same task) and yields control to the task scheduler.

In some embodiments, the continuations library subsystem includes a plurality of macros that automate management of continuation points without other input from a user of the RTOS. In some embodiments, the single stack is a single rewinding stack. In some embodiments, the RTOS further includes an executing task having a first priority; wherein the yield function includes a conditional-yield capability that yields control to the task scheduler only when at least one of the plurality of tasks has a higher priority than the first priority of the executing task.

In some embodiments, the RTOS further includes an event triggering function, wherein the event triggering function uses a first event control block associated with the first event used in the first task to continue after a first event used in the first blocking function to restore control to the first task, and a second event control block associated with the second event used in the second task to continue after a second event used in the second blocking function to restore control to the second task.

In some embodiments, the RTOS further includes one or more event control blocks used for event handling, including a first event control block associated with a first event used in the first task to continue after a first event used in the first blocking function is triggered to restore control to the first task, and a second event control block associated with a second event used in the second task to continue after a second event used in the second blocking function is triggered to restore control to the second task.

In some embodiments, the RTOS further includes event handling on the task level, wherein the event handling uses a first event control block associated with a first event used in the first task to continue after a first event used in the first blocking function is triggered to restore control to the first task, and a second event control block associated with a second event used in the second task to continue after a second event used in the second blocking function is triggered to restore control to the second task.

In some embodiments, the present invention provides a computerized method of real time operating system (RTOS) operation of a computer processor. This method includes performing, in the computer processor, a first plurality of tasks including a first task and a second task, wherein not all of the first plurality of tasks run at the same priority, wherein the first plurality of tasks share and use only a single stack; providing a single stack; using and sharing the single stack by all of the first plurality of tasks; automatically managing a plurality of continuation points, wherein the plurality of continuation points includes a first continuation point and a second continuation point; creating the first continuation point in the first task and yielding control to a task scheduler; selectively switching control to a highest-priority one of the first plurality of tasks using the task scheduler, wherein the second task is the highest-priority one of the first plurality of tasks; switching control back to the first task at the first continuation point at a later time; and executing a first blocking function within the first task such that the task scheduler switches to the second task and executing a second blocking function in the second task before continuing the first task after the first blocking function has executed.

In some embodiments, the creating of the first continuation point includes using a macro that automates management of the first continuation point without other input from a user of the RTOS. In some embodiments, the providing of the single stack includes providing a single rewinding stack. Some embodiments further include executing the first task having a first priority; wherein the yielding of control to the task scheduler includes conditionally yielding control to the task scheduler only when at least one of the plurality of tasks has a higher priority than the first priority of the executing first task. Some embodiments further include handling events, wherein the handling of events uses a first event control block associated with the first event used in the first task to continue after a first event used in the first blocking function is triggered to restore control to the first task, and a second event control block associated with the second event used in the second task to continue after a second event used in the second blocking function is triggered to restore control to the second task. Some embodiments further include handling events, wherein the handling of events uses a first event control block associated with a first event used in the first task to continue after a first event used in the first blocking function is triggered to restore control to the first task, and a second event control block associated with a second event used in the second task to continue after a second event used in the second blocking function is triggered to restore control to the second task. Some embodiments further include handling events, wherein the handling of events uses a first event control block associated with a first event used in the first task to continue after a first event used in the first blocking function is triggered to restore control to the first task, and a second event control block associated with a second event used in the second task to continue after a second event used in the second blocking function is triggered to restore control to the second task.

In some embodiments, the present invention provides a computer-readable medium having instructions embedded thereon, wherein the instructions, when performed on a computer processor, execute a method of real time operating system (RTOS) operation, the method including: performing, in the computer processor, a first plurality of tasks including a first task and a second task, wherein not all of the first plurality of tasks run at the same priority, wherein the first plurality of tasks share and use only a single stack; providing a single stack; using and sharing the single stack by all of the first plurality of tasks; automatically managing a plurality of continuation points, wherein the plurality of continuation points includes a first continuation point and a second continuation point; creating the first continuation point in the first task and yielding control to a task scheduler; selectively switching control to a highest-priority one of the first plurality of tasks using the task scheduler, wherein the second task is the highest-priority one of the first plurality of tasks; switching control back to the first task at the first continuation point at a later time; and executing a first blocking function within the first task such that the task scheduler switches to the second task and executing a second blocking function in the second task before continuing the first task after the first blocking function has executed.

Some embodiments further include instructions such that the creating of the first continuation point includes using a macro that automates management of the first continuation point without other input from a user of the RTOS. Some embodiments further include instructions such that the single stack is a single rewinding stack. Some embodiments further include instructions such that the first task is executed at a first priority; wherein the yielding of control to the task scheduler includes conditionally yielding control to the task scheduler only when at least one of the plurality of tasks has a higher priority than the first priority of the first task. Some embodiments further include instructions such that the method further includes handling events, wherein the handling of events uses a first event control block associated with the first event used in the first task to continue after a first event used in the first blocking function is triggered to restore control to the first task, and a second event control block associated with the second event used in the second task to continue after a second event used in the second blocking function is triggered to restore control to the second task. Some embodiments further include instructions such that the method further includes handling events, wherein the handling of events uses a first event control block associated with a first event used in the first task to continue after a first event used in the first blocking function is triggered to restore control to the first task, and a second event control block associated with a second event used in the second task to continue after a second event used in the second blocking function is triggered to restore control to the second task. Some embodiments further include instructions such that the method further includes handling events, wherein the handling of events uses a first event control block associated with a first event used in the first task to continue after a first event used in the first blocking function is triggered to restore control to the first task, and a second event control block associated with a second event used in the second task to continue after a second event used in the second blocking function is triggered to restore control to the second task.

In some embodiments, the present invention provides a computing apparatus having a real time operating system (RTOS). This apparatus includes: means for performing, in the computing apparatus, a first plurality of tasks including a first task and a second task, wherein not all of the first plurality of tasks run at the same priority, wherein the first plurality of tasks share and use only a single stack; a task scheduler; a single stack; means for using and sharing the single stack by all of the first plurality of tasks; means for automatically managing a plurality of continuation points, wherein the plurality of continuation points includes a first continuation point and a second continuation point; means for creating the first continuation point in the first task and for yielding control to the task scheduler; means for selectively switching control to a highest-priority one of the first plurality of tasks using the task scheduler, wherein the second task is the highest-priority one of the first plurality of tasks; means for switching control back to the first task at the first continuation point at a later time; and means for executing a first blocking function within the first task such that the task scheduler switches to the second task and executing a second blocking function in the second task before the first task is continued after the first blocking function has executed.

In some embodiments, the means for creating the first continuation point includes means for using a macro that automates management of the first continuation point without other input from a user of the RTOS. In some embodiments, the single stack is a single rewinding stack. In some embodiments, the first task is executed at a first priority; wherein the means for yielding control to the task scheduler includes means for conditionally yielding control to the task scheduler only when at least one of the plurality of tasks has a higher priority than the first priority of the first task.

Some embodiments further include means for handling events, wherein the means for handling of events uses a first event control block associated with a first event used in the first task to continue after a first event used in the first blocking function is triggered to restore control to the first task, and a second event control block associated with a second event used in the second task to continue after a second event used in the second blocking function is triggered to restore control to the second task.

Some embodiments further include means for handling events, wherein the means for handling events uses a first event control block associated with the first event used in the task to continue after a first event used in the first blocking function is triggered to restore control to the first task, and a second event control block associated with the second event used in the task to continue after a second event used in the second blocking function is triggered to restore control to the second task. Some embodiments further include means for handling events, wherein the means for handling of events uses a first event control block associated with a first event used in the first task to continue after a first event used in the first blocking function is triggered to restore control to the first task, and a second event control block associated with a second event used in the second task to continue after a second event used in the second blocking function is triggered to restore control to the second task.

In some embodiments, the present invention provides a real time operating system (RTOS) for a computer processor performing a plurality of tasks including at least one application task, wherein not all of the plurality of tasks run at the same priority. This RTOS includes a kernel that serves each of the plurality of tasks, the kernel including: a core having a task scheduler that reads from a task descriptor data structure to which each application task writes, a timer subsystem, in which a timer task reads from and writes to a timer-wait queue written by each of the plurality of application tasks, and the timer task also writes to the task-descriptor data structure, and a mutex subsystem that uses services provided by an event subsystem and the timer subsystem, wherein the event subsystem also serves the timer subsystem; and a continuations library that serves the kernel and each application task by using macros to automatically manage continuation points such that handling of the continuation points are hidden from a user.

Some embodiments further include a network subsystem served by the kernel and the continuations library, the network subsystem comprising: an Ethernet transmission task component, an Ethernet reception/timer task component, at least one local buffer writing to and from each of the Ethernet transmission task component and Ethernet reception/timer component; and at least one socket writing to and from each of the Ethernet transmission task component, the Ethernet reception/timer task component, and each application task.

In some embodiments, the network subsystem follows TCP/IP protocols.

The present invention also contemplates various combinations and subcombinations of the embodiments set forth in the above description.

It is to be understood that the above description is intended to be illustrative, and not restrictive. Although numerous characteristics and advantages of various embodiments as described herein have been set forth in the foregoing description, together with details of the structure and function of various embodiments, many other embodiments and changes to details will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein," respectively. Moreover, the terms "first," "second," and "third," etc., are used merely as labels, and are not intended to impose numerical requirements on their objects.

What is claimed is:

1. A computer processor and memory running a real-time operating system (RTOS) for the computer processor performing a first plurality of tasks including a first task and a second task, the RTOS comprising:
   a subsystem providing a plurality of task priorities such that not all of the first plurality of tasks run at the same priority, wherein the first plurality of tasks share and use only a single stack;
   a plurality of task queues including a pending queue, a running queue and a blocked queue;
   a task scheduler that uses the plurality of task queues including the pending queue, the running queue and the blocked queue, and that, when invoked, switches control to a highest-priority one from the pending queue of the first plurality of tasks;
   a continuations library subsystem that automatically manages a plurality of continuation points including a first continuation point;
   a yield function that sets the first continuation point in the first task and yields control to the task scheduler, whereupon the task scheduler switches control to the second task and wherein at a later time the task scheduler switches control back to the first task at the first continuation point; and
   a nested blocking function call subsystem, that invokes a second blocking function in the second task from within a first blocking function in the second task and yields control to the task scheduler, wherein the first blocking function identifies to the RTOS which event is to be waited for, wherein the event has an associated event control block that contains a pointer to a task control block of a task that is currently blocked on the event, such that the RTOS determines from the event control block of the event which task to invoke when the event is triggered, and if there is a task is waiting for this event when the event triggers, then the pending queue of tasks is updated, else a new event state is saved in an event control block and when the task next needs to wait for the event, the task checks the event state in the event control block and determines that the task does not need to be blocked.

2. The RTOS of claim 1, wherein the continuations library subsystem includes a plurality of macros that automate management of continuation points without other input from a user of the RTOS.

3. The RTOS of claim 1, wherein the single stack is a single rewinding stack.

4. The RTOS of claim 1, further including an executing task having a first priority;

wherein the yield function includes a conditional-yield capability that yields control to the task scheduler only when at least one of the plurality of tasks has a higher priority than the first priority of the executing task.

5. The RTOS of claim 1, further including one or more event control blocks used for event handling, including a first event control block associated with a first event used in the first task to continue after a first event used in the first blocking function is triggered to restore control to the first task, and a second event control block associated with a second event used in the second task to continue after a second event used in the second blocking function is triggered to restore control to the second task.

6. The RTOS of claim 1, wherein each of the first plurality of tasks has a unique single-bit-position priority number.

7. The RTOS of claim 1, wherein, for handling reentrant blocking functions, the continuations library subsystem includes:
 a compile-time allocator of resources for reentrant blocking functions;
 built-in constructs for declaring local variables of reentrant blocking functions in structures;
 inheritance-tree structures for creation of hierarchical storage of local and global variables used in context of reentrant blocking functions;
 a binder that binds structures used for reentrant blocking functions to tasks and that stores the structures in a task control block;
 a manager of hierarchical tasks to provide functionality of hierarchical scheduling; and
 macros for accessing variables.

8. A computerized method of real-time operating system (RTOS) operation of a computer processor having a memory, the method comprising:
 providing a single stack;
 performing, in the computer processor, a first plurality of tasks including a first task and a second task, wherein not all of the first plurality of tasks run at the same priority, wherein the first plurality of tasks share and use only the single stack;
 scheduling tasks using a plurality of task queues including a pending queue, a running queue and a blocked queue;
 using and sharing the single stack by all of the first plurality of tasks;
 automatically managing a plurality of continuation points, wherein the plurality of continuation points includes a first continuation point and a second continuation point;
 creating the first continuation point in the first task and yielding control to the scheduling of tasks, wherein the scheduling of tasks includes selectively switching control to a highest-priority one of the first plurality of tasks, wherein the second task is the highest-priority one from the pending queue of the first plurality of tasks;
 switching control back to the first task at the first continuation point at a later time; and
 executing a first blocking function within the first task such that the scheduling of tasks switches to the second task and executing a second blocking function in the second task before continuing the first task after the first blocking function has executed, wherein the first blocking function identifies to the RTOS which event is to be waited for, wherein the event has an associated event control block that contains a pointer to a task control block of a task that is currently blocked on the event, such that the RTOS determines from the event control block of the event which task to invoke when the event is triggered, and if there is a task is waiting for this event when the event triggers, then the pending queue of tasks is updated, else a new event state is saved in an event control block and when the task next needs to wait for the event, the task checks the event state in the event control block and determines that the task does not need to be blocked.

9. The method of claim 8, wherein the creating of the first continuation point includes using a macro that automates management of the first continuation point without other input from a user of the RTOS.

10. The method of claim 8, wherein the providing of the single stack includes providing a single rewinding stack.

11. The method of claim 8, further including executing the first task having a first priority;
 wherein the yielding of control to the scheduling of tasks includes conditionally yielding control to the scheduling of tasks only when at least one of the plurality of tasks has a higher priority than the first priority of the executing first task.

12. The method of claim 8, further including handling events, wherein the handling of events uses a first event control block associated with a first event used in the first task to continue after a first event used in the first blocking function is triggered to restore control to the first task, and a second event control block associated with a second event used in the second task to continue after a second event used in the second blocking function is triggered to restore control to the second task.

13. A non-transitory computer-readable medium having instructions embedded thereon, wherein the instructions, when performed on a computer processor, execute a method of real-time operating system (RTOS) operation, the method comprising:
 providing a single stack;
 performing, in the computer processor, a first plurality of tasks including a first task and a second task, wherein not all of the first plurality of tasks run at the same priority, wherein the first plurality of tasks share and use only the single stack;
 scheduling tasks using a plurality of task queues including a pending queue, a running queue and a blocked queue;
 using and sharing the single stack by all of the first plurality of tasks;
 automatically managing a plurality of continuation points, wherein the plurality of continuation points includes a first continuation point and a second continuation point;
 creating the first continuation point in the first task and yielding control to the scheduling of tasks, wherein the scheduling of tasks includes selectively switching control to a highest-priority one from the pending queue of the first plurality of tasks, wherein the second task is the highest-priority one of the first plurality of tasks;
 switching control back to the first task at the first continuation point at a later time; and
 executing a first blocking function within the first task such that the scheduling of tasks switches to the second task and executing a second blocking function in the second task before continuing the first task after the first blocking function has executed, wherein the first blocking function identifies to the RTOS which event is to be waited for, wherein the event has an associated event control block that contains a pointer to a task control block of a task that is currently blocked on the event, such that the RTOS determines from the event control block of the event which task to invoke when the event is triggered, and if there is a task is waiting for this event when the event triggers, then the pending queue of tasks is updated, else a new event state is saved in an event control block and when the task next needs to wait for the event, the task checks the event state in the event control block and determines that the task does not need to be blocked.

14. The computer-readable medium of claim 13, further comprising instructions such that the creating of the first continuation point includes using a macro that automates management of the first continuation point without other input from a user of the RTOS.

15. The computer-readable medium of claim 13, further comprising instructions such that the single stack is a single rewinding stack.

16. The computer-readable medium of claim 13, further comprising instructions such that the first task is executed at a first priority;
wherein the yielding of control to the scheduling of tasks includes conditionally yielding control to the scheduling of tasks only when at least one of the plurality of tasks has a higher priority than the first priority of the first task.

17. The computer-readable medium of claim 13, further comprising instructions such that the method further includes handling events, wherein the handling of events uses a first event control block associated with a first event used in the first task to continue after a first event used in the first blocking function is triggered to restore control to the first task, and a second event control block associated with a second event used in the second task to continue after a second event used in the second blocking function is triggered to restore control to the second task.

18. A computing apparatus including a processor and memory running a real-time operating system (RTOS), the apparatus comprising:
a single stack;
means for performing, in the computing apparatus, a first plurality of tasks including a first task and a second task, wherein not all of the first plurality of tasks run at the same priority, wherein the first plurality of tasks share and use only the single stack;
a plurality of task queues including a pending queue, a running queue and a blocked queue;
a task scheduler that uses the plurality of task queues including the pending queue, the running queue and the blocked queue;
means for using and sharing the single stack by all of the first plurality of tasks;
means for automatically managing a plurality of continuation points, wherein the plurality of continuation points includes a first continuation point and a second continuation point;
means for creating the first continuation point in the first task and for yielding control to the task scheduler;
means for selectively switching control to a highest-priority one from the pending queue of the first plurality of tasks using the task scheduler, wherein the second task is the highest-priority one of the first plurality of tasks;
means for switching control back to the first task at the first continuation point at a later time; and
means for executing a first blocking function within the first task such that the task scheduler switches to the second task and executing a second blocking function in the second task before the first task is continued after the first blocking function has executed, wherein the first blocking function identifies to the RTOS which event is to be waited for, wherein the event has an associated event control block that contains a pointer to a task control block of a task that is currently blocked on the event, such that the RTOS determines from the event control block of the event which task to invoke when the event is triggered, and if there is a task is waiting for this event when the event triggers, then the pending queue of tasks is updated, else a new event state is saved in an event control block and when the task next needs to wait for the event, the task checks the event state in the event control block and determines that the task does not need to be blocked.

19. The computing apparatus of claim 18, wherein the means for creating the first continuation point includes means for using a macro that automates management of the first continuation point without other input from a user of the RTOS.

20. The computing apparatus of claim 18, wherein the single stack is a single rewinding stack.

21. The computing apparatus of claim 18, wherein the first task is executed at a first priority;
wherein the means for yielding control to the task scheduler includes means for conditionally yielding control to the task scheduler only when at least one of the plurality of tasks has a higher priority than the first priority of the first task.

22. The computing apparatus of claim 18, further including means for handling events, wherein the means for handling of events uses a first event control block associated with a first event used in the first task to continue after a first event used in the first blocking function is triggered to restore control to the first task, and a second event control block associated with a second event used in the second task to continue after a second event used in the second blocking function is triggered to restore control to the second task.

* * * * *